US007738421B2

(12) United States Patent  (10) Patent No.: US 7,738,421 B2
McNamara et al.  (45) Date of Patent:  Jun. 15, 2010

(54) WAP PUSH OVER CELL BROADCAST

(75) Inventors: Justin McNamara, Atlanta, GA (US);
Jeffrey C. Mikan, Cumming, GA (US);
Carolyn Tuthill, Atlanta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 12/196,592

(22) Filed: Aug. 22, 2008

(65) Prior Publication Data

US 2008/0311937 A1   Dec. 18, 2008

Related U.S. Application Data

(63) Continuation of application No. 11/265,597, filed on Nov. 1, 2005, now Pat. No. 7,426,203.

(51) Int. Cl.
*H04W 4/00* (2009.01)
(52) U.S. Cl. .................. 370/329; 370/328; 370/341; 370/352; 455/434; 455/466
(58) Field of Classification Search ................ 370/282, 370/322, 338, 328–329, 341, 348; 455/403, 455/3.01, 414.1–414.3, 422.1, 424, 428, 455/433–434, 450–452.2, 464, 466, 509, 455/516–517, 566, 550.1, 558, 422
See application file for complete search history.

(56) References Cited

U.S. PATENT DOCUMENTS

| | | | |
|---|---|---|---|
| 6,097,949 A | 8/2000 | Jung et al. | |
| 6,301,484 B1 | 10/2001 | Rogers et al. | |
| 6,329,904 B1 | 12/2001 | Lamb | |
| 6,449,719 B1 | 9/2002 | Baker | |
| 6,493,559 B1 | 12/2002 | Pecen et al. | |
| 6,556,835 B1 | 4/2003 | Ravisto | |
| 6,617,964 B1 | 9/2003 | Lamb | |

(Continued)

FOREIGN PATENT DOCUMENTS

GB   2407002   4/2005

(Continued)

OTHER PUBLICATIONS

Gundlegard, David, "Automotive Telematics Services Based on Cell Broadcast," Master's thesis, Dpeartment of Science and Technology, Linköping University, Norrköping, Sweden, May 8, 2003, 55 pages.

(Continued)

*Primary Examiner*—Kamran Afshar
(74) *Attorney, Agent, or Firm*—Zagorin O'Brien Graham LLP

(57) ABSTRACT

A system provides push services and information to mobile stations via broadcast messages. The broadcast messages are made on predetermined cell broadcast channels, which are associated with an inbox on the mobile stations. Contained within the messages are Uniform Resource Locators (URL) that, when accessed, provide multimedia and other rich content to the mobile station. The system allows wireless carriers to provide features such as Wireless Access Protocol (WAP) push operations via cell broadcast to many mobile stations in a geographic area without the need to individually address messages to the mobile stations.

9 Claims, 2 Drawing Sheets

U.S. PATENT DOCUMENTS

| | | | |
|---|---|---|---|
| 6,867,688 | B2 | 3/2005 | Lamb |
| 7,096,044 | B2 | 8/2006 | Gil et al. |
| 7,123,719 | B2 | 10/2006 | Sowa et al. |
| 7,184,771 | B1* | 2/2007 | Mouly et al. ................ 455/450 |
| 7,254,614 | B2 | 8/2007 | Mulligan et al. |
| 7,269,146 | B2 | 9/2007 | Pecen et al. |
| 7,289,788 | B2 | 10/2007 | Shan |
| 7,426,203 | B1 | 9/2008 | McNamara et al. |
| 7,444,133 | B1 | 10/2008 | McNamara et al. |
| 7,444,137 | B1 | 10/2008 | McNamara et al. |
| 2001/0005670 | A1 | 6/2001 | Lahtinen |
| 2003/0007499 | A1 | 1/2003 | Rajahaime |
| 2003/0096600 | A1* | 5/2003 | Lewis et al. ................ 455/412 |
| 2003/0208613 | A1 | 11/2003 | Signes et al. |
| 2004/0038645 | A1 | 2/2004 | Rounamaki et al. |
| 2004/0063445 | A1* | 4/2004 | Vaananen ................ 455/466 |
| 2004/0081192 | A1 | 4/2004 | Koulakiotis et al. |
| 2004/0106396 | A1 | 6/2004 | Segura et al. |
| 2004/0110462 | A1 | 6/2004 | Forstadius |
| 2004/0148357 | A1* | 7/2004 | Corrigan et al. ............ 709/206 |
| 2004/0204092 | A1 | 10/2004 | Sato |
| 2005/0020316 | A1* | 1/2005 | Mahini ................ 455/566 |
| 2005/0037728 | A1 | 2/2005 | Binzel et al. |
| 2005/0117602 | A1* | 6/2005 | Carrigan et al. ............ 370/466 |
| 2005/0117743 | A1 | 6/2005 | Bender et al. |
| 2005/0198193 | A1* | 9/2005 | Halme ................ 709/217 |
| 2005/0233776 | A1 | 10/2005 | Allen et al. |
| 2005/0266864 | A1 | 12/2005 | Chen et al. |
| 2006/0007920 | A1 | 1/2006 | Michel et al. |
| 2006/0025157 | A1 | 2/2006 | Kuwahara et al. |
| 2006/0034202 | A1 | 2/2006 | Kuure et al. |
| 2006/0069746 | A1 | 3/2006 | Davis et al. |
| 2006/0092953 | A1 | 5/2006 | Haverinen et al. |
| 2006/0107287 | A1 | 5/2006 | Lee et al. |
| 2006/0155698 | A1 | 7/2006 | Vayssiere |
| 2006/0223499 | A1 | 10/2006 | Pecen et al. |
| 2006/0265489 | A1 | 11/2006 | Moore |
| 2006/0293028 | A1 | 12/2006 | Gadamsetty et al. |
| 2007/0093247 | A1* | 4/2007 | Yaqub ................ 455/436 |

FOREIGN PATENT DOCUMENTS

| | | |
|---|---|---|
| WO | WO9966747 | 12/1999 |
| WO | WO0172062 | 9/2001 |

OTHER PUBLICATIONS

Search Report dated Mar. 16, 2007 for App. No. PCT/US2006/041742.

U.S. Appl. No. 11/265,602, filed Nov. 1, 2005, entitled "Cell Broadcast Updates to Application Software," naming inventors Justin McNamara, Jeffrey C. Mikan and Carolyn Tuthill.

U.S. Appl. No. 11/265,601, filed Nov. 1, 2005, entitled "Cell Broadcast via Encoded Message to an Embedded Client," naming inventors Justin McNamara, Jeffrey C. Mikan and Carolyn Tuthill.

U.S. Appl. No. 11/195,035, filed Aug. 3, 2005, entitled "Location Based Broadcast," naming inventors Jeffrey C. Mikan and Carolyn Tuthill.

Mitre, "Evaluation of Cellular Push-to-Talk Technology for First Responder COmmunications," Version 1.1, Innovation Grant (IG) Report, Center for Enterprise Modernization, Sep. 23, 2004, 23 pages, URL: <www.mitre.org/work/tech_papers_04/4_1055>.

3G Americas, "IP Multimedia Subsystem (IMS) Overview and Applications," Jul. 2004, 17 pages.

U.S. Appl. No. 11/196,035, filed Aug. 3, 2005, entitled "Location Based Broadcast," naming inventors Jeffrey C. Mikan and Carolyn Tuthill.

Final Office Action mailed Dec. 10, 2008 in U.S. Appl. No. 11/196,035, 9 pages.

Non-Final Office Action mailed Feb. 25, 2009 in U.S. Appl. No. 11/196,035, 7 pages.

Final Office Action mailed Aug. 18, 2009 in U.S. Appl. No. 12/255,724, 14 pages.

Non-Final Office Action mailed Feb. 24, 2009 in U.S. Appl. No. 12/255,724, 11 pages.

* cited by examiner

WAP PUSH OVER CELL BROADCAST

CROSS-REFERENCE TO RELATED APPLICATION(S)

This application is a continuation of co-pending application Ser. No. 11/265,597, filed Nov. 1, 2005, entitled "WAP Push Over Cell Broadcast" naming Justin McNamara, Jeffrey C. Mikan and Carolyn Tuthill as inventors, which application is hereby incorporated by reference.

BACKGROUND

1. Field of the Invention

The present invention is directed to wireless services. In particular, the present invention is directed to a broadcast mechanism for pushing services and information to client devices.

2. Description of the Related Art

Global System for Mobile communication (GSM) is one of the most widely wireless access systems in today's fast growing communication systems. GSM provides circuit-switched data services to subscribers, such as mobile telephone or computer users. General Packet Radio Service (GPRS), which is an extension to GSM technology, introduces packet switching to GSM networks. GPRS uses a packet-based wireless communication technology to transfer high and low speed data and signaling in an efficient manner. GPRS optimizes the use of network and radio resources, thus enabling the cost effective and efficient use of GSM network resources for packet mode applications.

Conventional GSM systems provide for broadcast services, such as cell broadcast. When a cell broadcast is made, all clients of such systems receive the broadcast message. Conventional systems are only able to broadcast text messages and are unable to communicate additional information via cell broadcast. As such, Wireless Application Protocol (WAP) messages or Multimedia Messaging Service (MMS) information cannot be sent in the conventional cell broadcast message. This limits the amount of information that can be conveyed and reduces the usefulness of the cell broadcast functionality.

SUMMARY

A system provides push services and information to mobile stations via broadcast messages. The broadcast messages are made on predetermined cell broadcast channels, which are associated with an inbox on the mobile stations. Contained within the messages are Uniform Resource Locators (URL) that when accessed, provide multimedia and other rich content to the mobile station. The system allows wireless carriers to provide features such as Wireless Access Protocol (WAP) push operations via cell broadcast to many mobile stations in a geographic area without the need to individually address messages to the mobile stations. The present invention also allows wireless carriers to provide geographically-targeted content to mobile stations without the need to know which mobile stations are in a particular area.

Additional features of the invention are described below.

DESCRIPTION OF THE PREFERRED EMBODIMENT(S)

Figure 1:
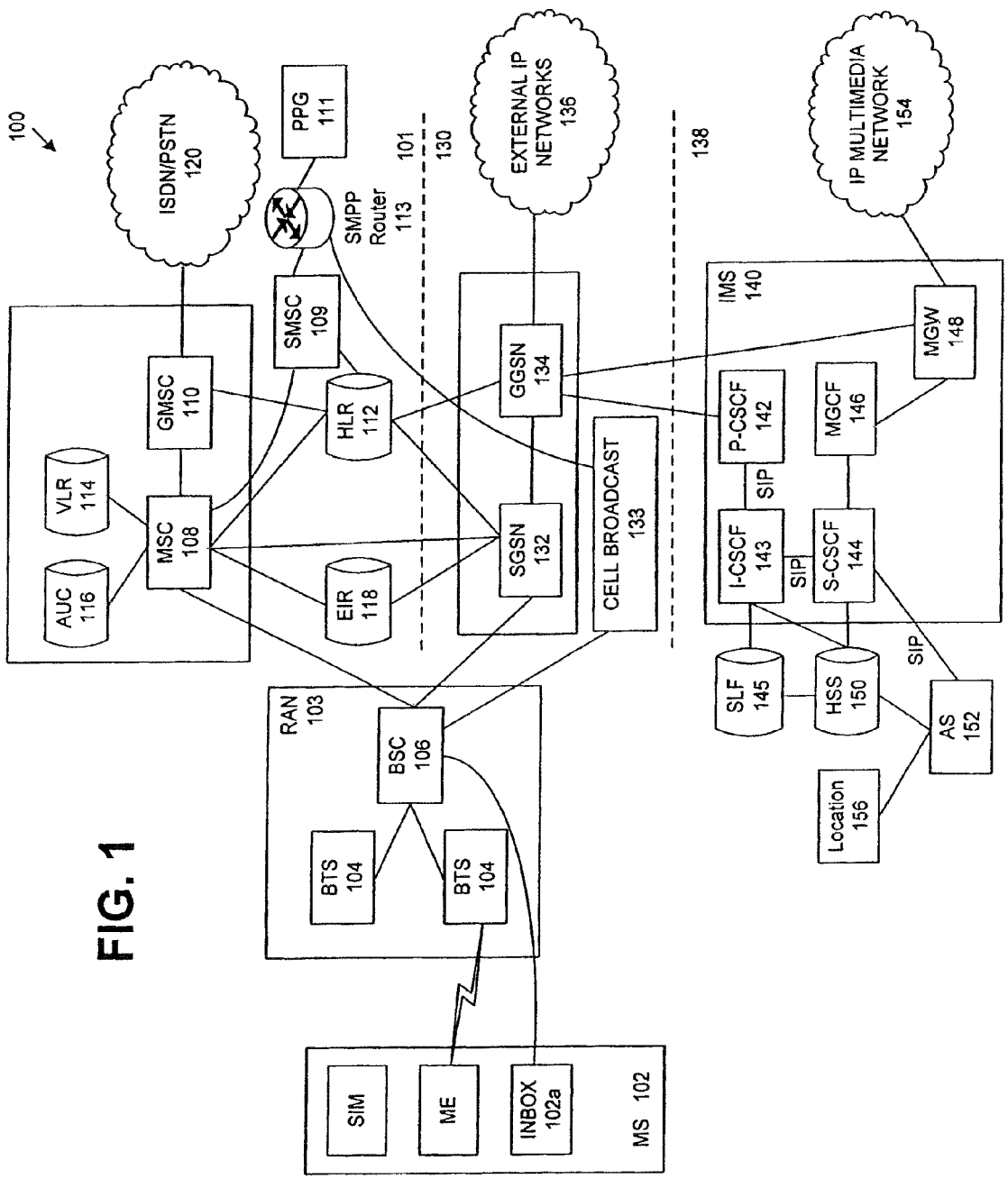
FIG. 1 illustrates an exemplary GSM/GPRS/IP multimedia network architecture.

FIG. 1 shows a GSM/GPRS/IP multimedia network architecture 100 that includes a GSM core network 101, a GPRS (General Patent Radio Service) network 130 and an IP multimedia network 138. The GSM core network 101 includes a Mobile Station (MS) 102, at least one Base Transceiver Station (BTS) 104 and a Base Station Controller (BSC) 106. The MS 102 is physical equipment or Mobile Equipment (ME), such as a mobile phone or a laptop computer that is used by mobile subscribers, with a Subscriber Identity Module (SIM). The SIM includes an International Mobile Subscriber Identity (IMSI), which is a unique identifier of a subscriber. The MS 102 includes a push inbox 102a that receives messages broadcast by the wireless carrier.

The BTS 104 is physical equipment, such as a radio tower, that enables a radio interface to communicate with the MS. Each BTS may serve more than one MS. The BSC 106 manages radio resources, including the BTS. The BSC may be connected to several BTSs. The BSC and BTS components, in combination, are generally referred to as a Base Station (BSS) or Radio Access Network (RAN) 103.

The GSM core network 101 also includes a Mobile Switching Center (MSC) 108, a Gateway Mobile Switching Center (GMSC) 110, a Home Location Register (HLR) 112, Visitor Location Register (VLR) 114, an Authentication Center (AuC) 118, and an Equipment Identity Register (EIR) 116. The MSC 108 performs a switching function for the network. The MSC also performs other functions, such as registration, authentication, location updating, handovers, and call routing. The GMSC 110 provides a gateway between the GSM network and other networks, such as an Integrated Services Digital Network (ISDN) or Public Switched Telephone Networks (PSTNs) 120. In other words, the GMSC 110 provides interworking functionality with external networks.

The HLR 112 is a database that contains administrative information regarding each subscriber registered in a corresponding GSM network. The HLR 112 also contains the current location of each MS. The VLR 114 is a database that contains selected administrative information from the HLR 112. The VLR contains information necessary for call control and provision of subscribed services for each MS currently located in a geographical area controlled by the VLR. The HLR 112 and the VLR 114, together with the MSC 108, provide the call routing and roaming capabilities of GSM. The AuC 116 provides the parameters needed for authentication and encryption functions. Such parameters allow verification of a subscriber's identity. The EIR 118 stores security-sensitive information about the mobile equipment.

A Short Message Service Center (SMSC) 109 allows one-to-one Short Message Service (SMS) messages to be sent to/from the MS 102. A Push Proxy Gateway (PPG) 111 is used to "push" (i.e., send without a synchronous request) content to the MS 102. The PPG 111 acts as a proxy between wired and wireless networks to facilitate pushing of data to the MS 102. A Short Message Peer to Peer (SMPP) protocol router 113 is provided to convert SMS-based SMPP messages to cell broadcast messages. SMPP is a protocol for exchanging SMS messages between SMS peer entities such as short message service centers. It is often used to allow third parties, e.g., content suppliers such as news organizations, to submit bulk messages.

To gain access to GSM services, such as speech, data, and Short Message Service (SMS), the MS first registers with the network to indicate its current location by performing a location update and IMSI attach procedure. The MS 102 sends a location update including its current location information to the MSC/VLR, via the BTS 104 and the BSC 106. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 130 is logically implemented on the GSM core network architecture by introducing two packet-switching network nodes, a Serving GPRS support node (SGSN) 132, a cell broadcast and a Gateway GPRS support node (GGSN) 134. The SGSN 132 is at the same hierarchical level as the MSC 108 in the GSM network. The SGSN controls the connection between the GPRS network and the MS 102. The SGSN also keeps track of individual MS's locations and security functions and access controls.

A Cell Broadcast Center (CBC) 133 communicates cell broadcast messages that are typically delivered to multiple users in a specified area. Cell Broadcast is a one-to-many geographically focused service. It enables messages to be communicated to multiple mobile phone customers who are located within a given part of its network coverage area at the time the message is broadcast.

The GGSN 134 provides a gateway between the GPRS network and a Public Packet Network (PDN) or other IP networks 136. That is, the GGSN provides interworking functionality with external networks, and sets up a logical link to the MS through the SGSN. When packet-switched data leaves the GPRS network, it is transferred to an external TCP-IP network 136, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one of three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 130 can be designed to operate in three network operation modes (NOM1, NOM2 and NOM3). A network operation mode of a GPRS network is indicated by a parameter in system information messages transmitted within a cell. The system information messages directs a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not receive pages from a circuit switched domain when engaged in a data call, since the MS is receiving data and is not listening to a paging channel. In a NOM3 network, a MS can monitor pages for a circuit switched network while receiving data and vice versa.

The IP multimedia network 138 was introduced with 3GPP Release 5, and includes an IP multimedia subsystem (IMS) 140 to provide rich multimedia services to end users. A representative set of the network entities within the IMS 140 are a call/session control function (CSCF), a media gateway control function (MGCF) 146, a media gateway (MGW) 148, and a master subscriber database, called a home subscriber server (HSS) 150. The HSS 150 may be common to the GSM network 101, and the GPRS network 130, as well as the IP multimedia network 138.

The IP multimedia system 140 is built around the call/session control function, of which there are three types: an interrogating CSCF (I-CSCF) 143, a proxy CSCF (P-CSCF) 142, and a serving CSCF (S-CSCF) 144. The P-CSCF 142 is the MS's first point of contact with the IMS 140. The P-CSCF 142 forwards session initiation protocol (SIP) messages received from the MS to an SIP server in a home network (and vice versa) of the MS. The P-CSCF 142 may also modify an outgoing request according to a set of rules defined by the network operator (for example, address analysis and potential modification).

The I-CSCF 143, forms an entrance to a home network and hides the inner topology of the home network from other networks and provides flexibility for selecting an S-CSCF. The I-CSCF 143 may contact a subscriber location function (SLF) 145 to determine which HSS 150 to use for the particular subscriber, if multiple HSSs 150 are present. The SCSCF 144 performs the session control services for the MS 102. This includes routing originating sessions to external networks and routing terminating sessions to visited networks. The S-CSCF 144 also decides whether an application server AS 152 is required to receive information on an incoming SIP session request to ensure appropriate service handling. This decision is based on information received from the HSS 150 (or other sources, such as an application server 152). The AS 152 also communicates to a location server 156 (e.g., a Gateway Mobile Location Center (GMLC)) that provides a position (e.g., latitude/longitude coordinates) of the MS 102.

The HSS 150 contains a subscriber profile and keeps track of which core network node is currently handling the subscriber. It also supports subscriber Authentication and Authorization functions (AAA). In networks with more than one HSS 150, a subscriber location function provides information on the HSS 150 that contains the profile of a given subscriber.

The MGCF 146 provides interworking functionality between SIP session control signaling from the IMS 140 and ISUP/BICC call control signaling from the external GSTN networks (not shown). It also controls the Media Gateway (MGW) 148 that provides user-plane interworking functionality (e.g., converting between AMR- and PCM-coded voice). The MGW 148 also communicates with other IP multimedia networks 154.

WAP Push Via Cell Broadcast

Conventionally, WAP push is performed by sending SMS messages via the SMSC 109 to individual mobile stations 102. This requires that each message be individually addressed to a receiving MS 102. The present invention provides for pushing of Wireless Application Protocol (WAP) messages (and other services and information) via cell broadcast, which advantageously eliminates the need to address individual messages and allows for a single broadcast message to reach large numbers of mobile stations.

Figure 2:
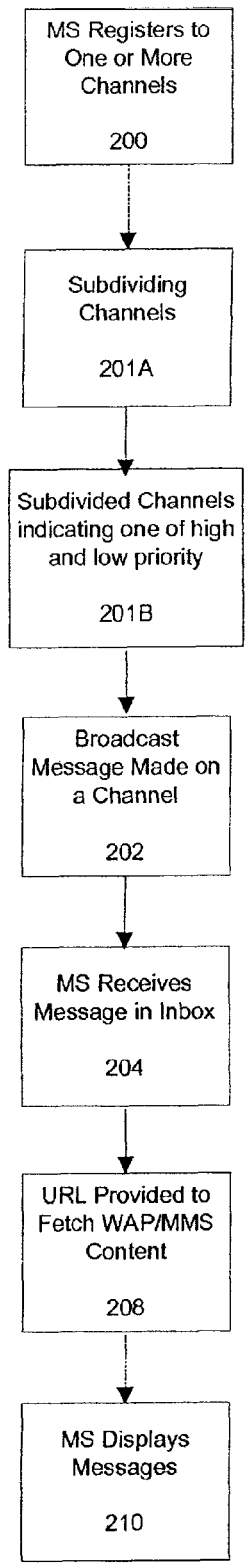
FIG. 2 illustrates exemplary processes performed in accordance with the present invention.

Referring to FIGS. 1 and 2, at step 200, the mobile stations 102 may be listening to a broadcast channel on which broadcasts are communicated. This broadcast channel may be subdivided into channels (step 201A). The channels may be assigned different priorities, where high priority channels broadcast important information and some low priority channels broadcast other information (step 201B). The customer and/or the wireless carrier may specify the channels to which the MS 102 is listening (step 200).

When a cell broadcast message is to be communicated, the PPG 111 (or other originating element) may specify to which region the broadcast is to be made. The cell broadcast may also be scheduled to go out at a certain time and on a certain channel. The CBC 133 is connected to switches and cell sites 103 in each region and sends one message to the cell sites 103 at the appropriate time and on the appropriate channel (step 202).

The MSs 102 subscribed to the cell broadcast channel receive the message and place it in the push inbox 102a (step 204). The MS 102 is configured such that messages received on a predetermined channel are sent to the push inbox 102a. These messages contain WAP push or other pushed information. The push inbox 102a is monitored by the MS 102 for a Uniform Resource Locator (URL). A user may click (or the MS 102 may automatically) navigate to the location specified in the URL to obtain more information (step 208). Multiple cell broadcast messages may be combined into one message at the MS 102 to provide more information. As such, additional text associated with the push message may be displayed on the MS 102 (step 210).

As an example of the above, if a wireless carrier broadcasts an Amber Alert to all MSs 102 in a geographic area to report a missing child, information such as a license number may be provided in the text of the cell broadcast. A picture of the missing child may be provided via the WAP push mechanism. Similarly, a weather alert may be provided together with video of a radar image, etc. Other types of WAP push scenarios would be evident to one of ordinary skill in the art.

While the present invention has been described in connection with the preferred embodiments of the various figures, it is to be understood that other similar embodiments may be used or modifications and additions may be made to the described embodiment for performing the same function of the present invention without deviating therefrom. For example, one skilled in the art will recognize that the present invention as described in the present application may apply to any environment, whether wired or wireless, and may be applied to any number of such devices connected via a communications network and interacting across the network. Therefore, the present invention should not be limited to any single embodiment, but rather should be construed in breadth and scope in accordance with the appended claims.

What is claimed is:

1. A system for delivering multimedia content via a wireless network to a mobile station using a broadcast mechanism, comprising:
   a push proxy gateway (PPG);
   a short message peer to peer (SMPP) router that receives an SMPP message from said push proxy gateway and converts said SMPP message to a cell broadcast text message;
   a cell broadcast center that pushes multimedia access content in said cell broadcast text message on a predetermined cell broadcast channel; and
   a mobile station configured to place said cell broadcast text message received on the predetermined cell broadcast channel in an inbox and monitor said inbox for multimedia access content included in said cell broadcast text message and configured to access said multimedia content using said multimedia access content in response to a command.

2. The system of claim 1, wherein said multimedia access content is communicated to all mobile stations within a predetermined geographic area.

3. The system of claim 2, wherein said multimedia access content is placed in an inbox on said mobile station in accordance with said predetermined cell broadcast channel.

4. The system of claim 1, wherein said multimedia access content includes a Uniform Resource Locator (URL).

5. The system of claim 4, wherein said multimedia content includes at least one of Wireless Access Protocol (WAP) information or Multimedia Messaging Services (MMS) information.

6. An apparatus comprising:
   a mobile station configured to receive text messages pushed to the mobile station on a broadcast channel and configured to place received text messages in an inbox, wherein said mobile station is configured to monitor said inbox for text messages including a Uniform Resource Locator (URL) and configured to establish a connection based on a URL detected in a text message and in response to a command to obtain multimedia services associated with the text message,
   wherein said mobile station is configured to register to one or more channels, subdivide said one or more channels into a plurality of subchannels, receive messages on one or more of said subchannels, and send messages to said inbox from a predetermined channel of said plurality of subchannels.

7. The apparatus of claim 6, wherein said multimedia services includes at least one of Wireless Access Protocol (WAP) information or Multimedia Messaging Services (MMS) information.

8. The apparatus of claim 6, wherein said text message is received in multiple parts, and said mobile station is configured to combine said multiple parts into a single message.

9. The apparatus of claim 6, wherein said text message is communicated to all mobile stations in a predetermined geographic area.

* * * * *